US010125902B2

(12) United States Patent
Chiang

(10) Patent No.: US 10,125,902 B2
(45) Date of Patent: Nov. 13, 2018

(54) COMPRESSIVE HEAT-RESISTANT TUBE STRUCTURE FOR RV

(71) Applicant: Shen-En Chiang, Taichung (TW)

(72) Inventor: Shen-En Chiang, Taichung (TW)

( * ) Notice: Subject to any disclaimer, the term of this patent is extended or adjusted under 35 U.S.C. 154(b) by 65 days.

(21) Appl. No.: 15/342,997

(22) Filed: Nov. 3, 2016

(65) Prior Publication Data

US 2018/0106397 A1 Apr. 19, 2018

(30) Foreign Application Priority Data

Oct. 13, 2016 (TW) .............................. 105215562 U

(51) Int. Cl.
*F16L 55/00* (2006.01)
*F16L 11/12* (2006.01)
*F16L 11/10* (2006.01)

(52) U.S. Cl.
CPC .............. *F16L 11/125* (2013.01); *F16L 11/10* (2013.01); *F16L 11/124* (2013.01)

(58) Field of Classification Search
CPC .............................. F16L 11/124; F16L 11/115
USPC .......................................... 138/123–125, 104
See application file for complete search history.

(56) References Cited

U.S. PATENT DOCUMENTS

| | | | | |
|---|---|---|---|---|
| 4,228,824 A * | 10/1980 | Evans | ..................... | A01G 25/00 138/119 |
| 5,402,592 A * | 4/1995 | Caveney | ................... | G09F 3/14 40/316 |
| 5,964,409 A * | 10/1999 | Alexander | ............ | F16L 11/085 138/125 |
| 6,158,476 A * | 12/2000 | Sjotun | .................... | F16L 11/086 138/124 |
| 6,397,894 B2 * | 6/2002 | Leray | ...................... | F16L 9/121 138/125 |
| 7,644,736 B2 * | 1/2010 | Bittenbender | .......... | F16L 11/10 138/124 |
| 7,748,412 B2 * | 7/2010 | Mennig | ................. | F16L 11/085 138/123 |
| 8,770,233 B2 * | 7/2014 | Mezzalira | .............. | D04B 1/225 138/125 |
| 8,985,159 B2 * | 3/2015 | Caneva | ................ | D04B 21/205 138/123 |
| 2008/0105283 A1 * | 5/2008 | Pianetto | ................ | F16L 11/085 134/198 |
| 2013/0000771 A1 * | 1/2013 | Beaton | .................... | E03C 1/021 138/96 R |

* cited by examiner

*Primary Examiner* — Patrick F Brinson
(74) *Attorney, Agent, or Firm* — The Law Office of Austin Bonderer, PC; Austin Bonderer

(57) ABSTRACT

A compressive heat-resistant tube structure for RV includes a compressive heat-resistant multi-layer tube. The compressive heat-resistant multi-layer tube includes a compressive heat-resistant PVC soft inner tube, a polyester dense crocheted covering layer, and a compressive PVC soft outer tube. An outer surface of the compressive PVC soft outer tube is provided with an identification surface layer portion. The identification surface layer portion enables the user to easily and quickly identify each tube for connection of tubes. The soft compressive heat-resistant multi-layer tube can be bent according to the demand of use, not limited to the arrangement of the edge wiring. The soft compressive heat-resistant multi-layer tube is convenient for use and can be installed conveniently.

8 Claims, 9 Drawing Sheets

COMPRESSIVE HEAT-RESISTANT TUBE STRUCTURE FOR RV

FIELD OF THE INVENTION

The present invention relates to a compressive heat-resistant tube structure for RV, and more particularly to a tube structure applied to a camping car.

BACKGROUND OF THE INVENTION

FIG. 9 shows a conventional water pipe structure for RV. A pipe assembly installed inside a camping car comprises a plurality of hard pipes 21 in cooperation with T-shaped branching connectors 22, a plurality of retaining rings 23, a plurality of control valve heads 24, and a plurality of corner connectors 25. The hard pipes 21 are cut for a required length according to the corner of the installation space and then fixedly connected with the T-shaped branching connectors 22 and the retaining rings 23. The ends of the hard pipes 22 are connected with the control valve heads 24 through the retaining rings 23, respectively. The piping arrangement of the hard pipes 21 must be fitted with the RV body structure in the form of an edge wiring. At the corners, it is necessary to use the T-shaped branching connectors 22 in cooperation with the retaining rings 23. This way is inconvenient for piping, and the required parts and the labor cost are increased. The pipe structure is unable to provide a simply way for the user to identify the purpose of each pipe. It is easy to make a mistake in the connection of the pipes. Accordingly, the inventor of the present invention has devoted himself based on his many years of practical experiences to solve this problem.

SUMMARY OF THE INVENTION

The primary objective of the present invention is to provide a compressive heat-resistant tube structure for RV. The compressive heat-resistant tube structure for RV comprises a compressive heat-resistant multi-layer tube. The compressive heat-resistant multi-layer tube comprises a compressive heat-resistant PVC soft inner tube, a polyester dense crocheted covering layer, and a compressive PVC soft outer tube. An outer surface of the compressive PVC soft outer tube is provided with an identification surface layer portion. The identification surface layer portion is disposed on the compressive PVC soft outer tube in a circumferential or semi-circumferential manner. The identification surface layer portion may be blue, red or black, or may be marked with characters or signs. The compressive heat-resistant PVC soft inner tube is wrapped by the polyester dense crocheted covering layer. The polyester dense crocheted covering layer is wrapped by the compressive PVC soft outer tube. Through the cooperation of the compressive heat-resistant PVC soft inner tube, the polyester dense crocheted covering layer and the compressive PVC soft outer tube, the pressure resistance of the compressive heat-resistant multi-layer tube can be improved to 300 PSI. The outer surface of the compressive PVC soft outer tube is provided with the identification surface layer portion for distinguishing a cold water tube, a hot water tube or a waste water tube, enabling the user to easily and quickly identify each tube for connection of the tubes. The soft compressive heat-resistant multi-layer tube can be bent according to the demand of use, not limited to the arrangement of the edge wiring so as to reduce the required parts and the labor cost. The soft compressive heat-resistant multi-layer tube is convenient for use and can be installed conveniently.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
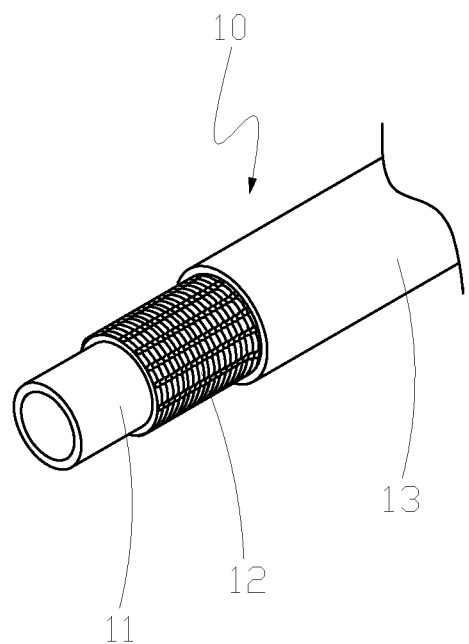
FIG. 1 is a perspective view of the compressive heat-resistant tube structure for RV of the present invention.
Figure 2:
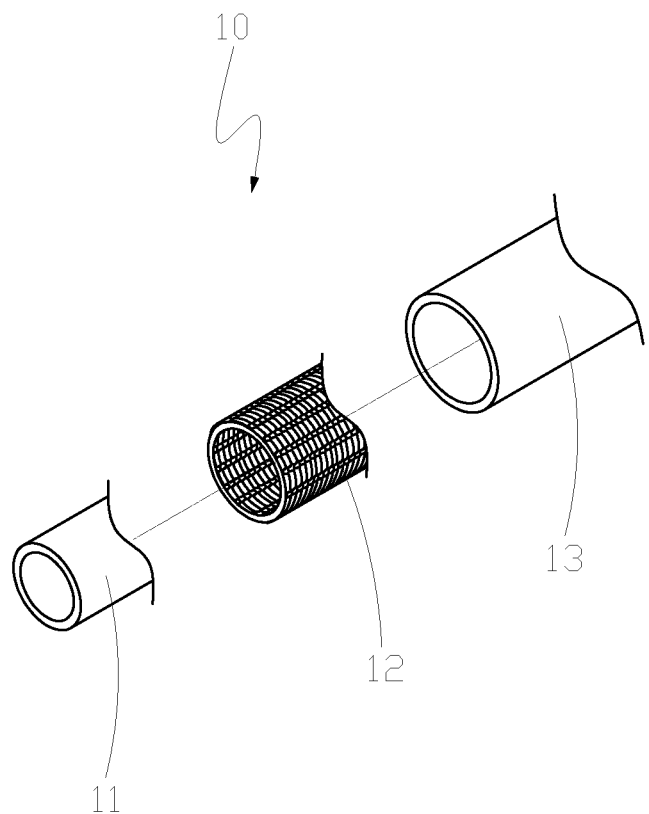
FIG. 2 is an exploded view of the compressive heat-resistant tube structure for RV of the present invention.
Figure 3:
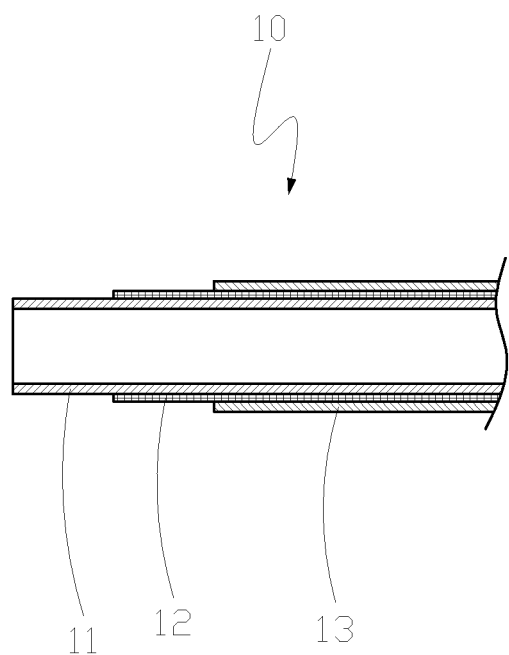
FIG. 3 is a side sectional view of the compressive heat-resistant tube structure for RV of the present invention.

Referring to FIG. 1 through FIG. 3, FIG. 1 is a perspective view of the compressive heat-resistant tube structure for RV of the present invention. FIG. 2 is an exploded view of the compressive heat-resistant tube structure for RV of the present invention. FIG. 3 is a side sectional view of the compressive heat-resistant tube structure for RV of the present invention.

The compressive heat-resistant tube structure for RV of the present invention comprises a compressive heat-resistant multi-layer tube 10. The compressive heat-resistant multi-layer tube 10 comprises a compressive heat-resistant PVC soft inner tube 11, a polyester dense crocheted covering layer 12, and a compressive PVC soft outer tube 13. An outer surface of the compressive PVC soft outer tube 13 is provided with an identification surface layer portion 130.

The compressive heat-resistant PVC soft inner tube 11 is wrapped by the polyester dense crocheted covering layer 12. The polyester dense crocheted covering layer 12 is wrapped by the compressive PVC soft outer tube 13.

Through the cooperation of the above-mentioned structure, the compressive heat-resistant tube structure for RV of the present invention is accomplished.

Figure 4:
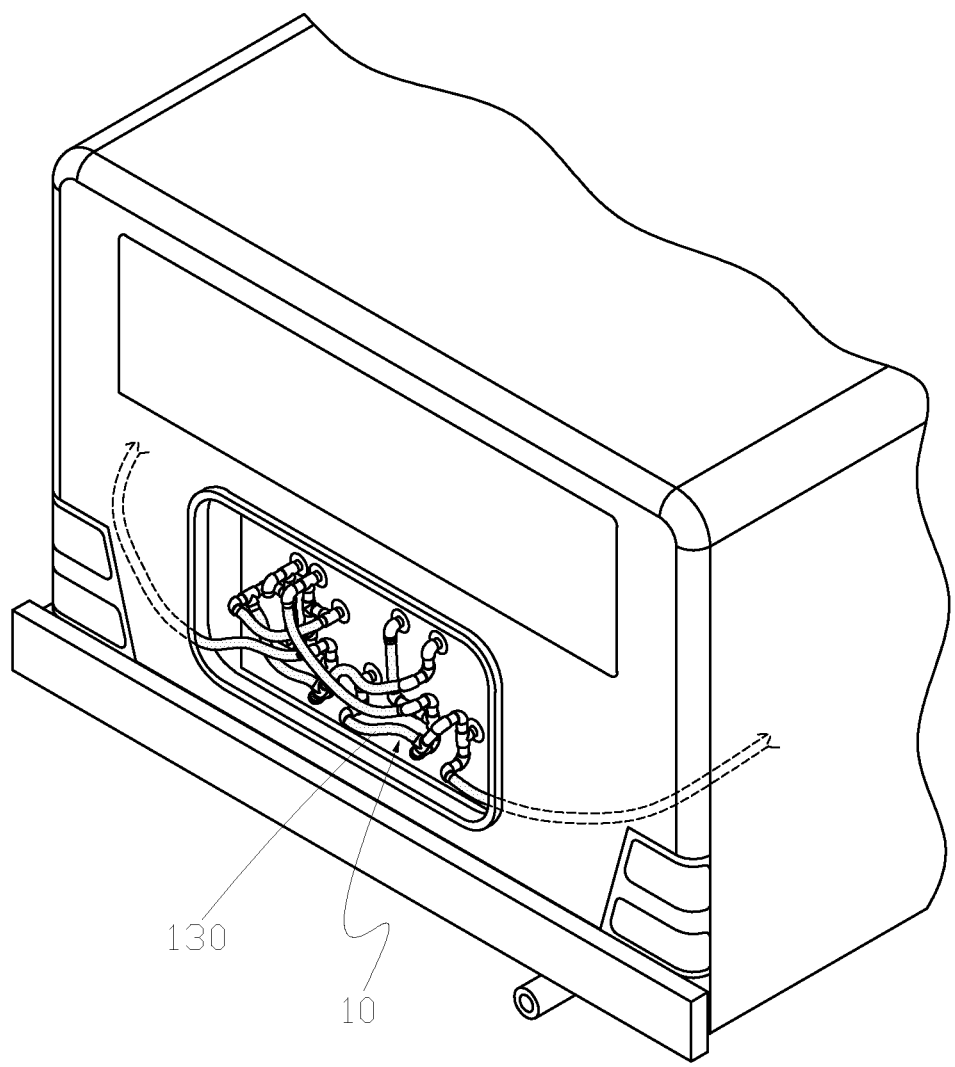
FIG. 4 is a schematic view of the compressive heat-resistant tube structure for RV of the present invention applied to a camping car.

Referring to FIG. 2 through FIG. 4, FIG. 2 is an exploded view of the compressive heat-resistant tube structure for RV of the present invention. FIG. 3 is a side sectional view of the compressive heat-resistant tube structure for RV of the present invention. FIG. 4 is a schematic view of the compressive heat-resistant tube structure for RV of the present invention applied to a camping car. The compressive heat-resistant PVC soft inner tube 11 is made of a material suitable for drinking water. The polyester dense crocheted covering layer 12 is made of polyester wires and formed in a dense-knitted crocheting manner. The compressive heat-resistant PVC soft inner tube 11 is wrapped by the polyester dense crocheted covering layer 12. The polyester dense crocheted covering layer 12 is wrapped by the compressive PVC soft outer tube 13. The compressive heat-resistant PVC soft inner tube 11 is used to deliver drinking water. Through the cooperation of the compressive heat-resistant PVC soft inner tube 11, the polyester dense crocheted covering layer 12 and the compressive PVC soft outer tube 13, the pressure resistance of the compressive heat-resistant multi-layer tube 10 can be improved to 300 PSI. The configuration of the soft tube is flexible, so that the compressive heat-resistant multi-layer tube 10 can be directly bent at a corner position when it is applied to a camping car, without the need for cutting tubes and fitting of the other corner fittings. The arrangement of the identification surface layer portion 130 allows the user to easily and quickly identify each tube for connection of the tubes. The soft compressive heat-resistant multi-layer tube 10 can be bent according to the demand of use, not limited to the arrangement of the edge wiring so as to reduce the required parts and the labor cost. The soft compressive heat-resistant multi-layer tube 10 is convenient for use and can be installed conveniently.

Figure 5:
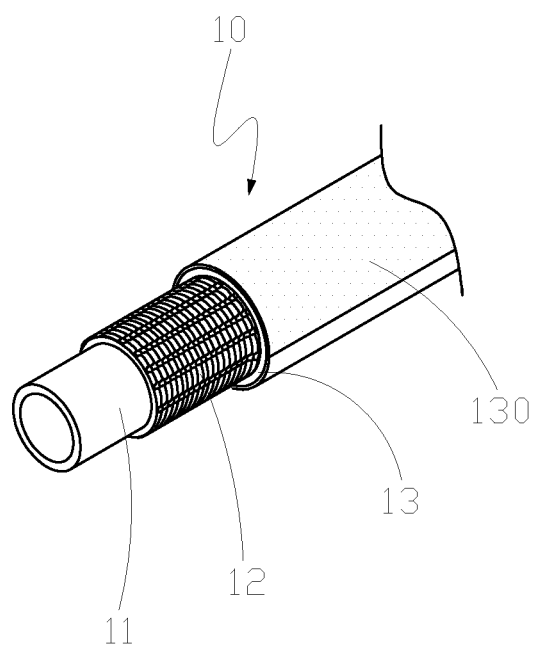
FIG. 5 is a schematic view of the compressive heat-resistant tube structure for RV in accordance with a first embodiment of the present invention, showing that the compressive PVC soft outer tube is wrapped by the identification surface layer portion in a semi-circumferential manner.
Figure 6:
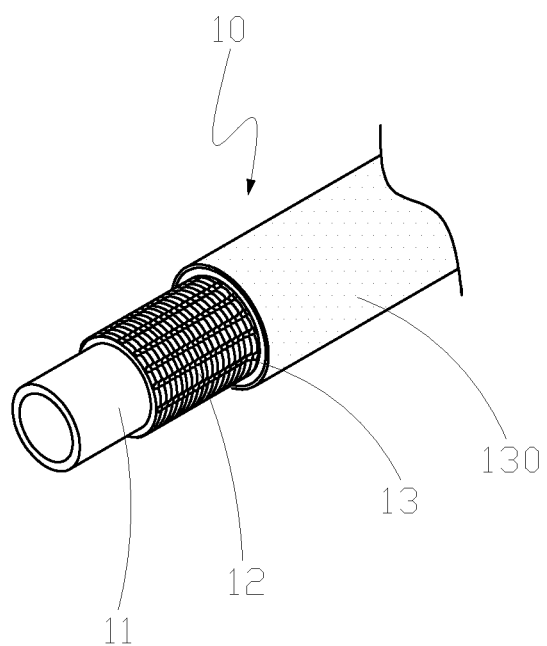
FIG. 6 is a schematic view of the compressive heat-resistant tube structure for RV in accordance with a second embodiment of the present invention, showing that the compressive PVC soft outer tube is wrapped by the identification surface layer portion in a circumferential manner.
Figure 7:
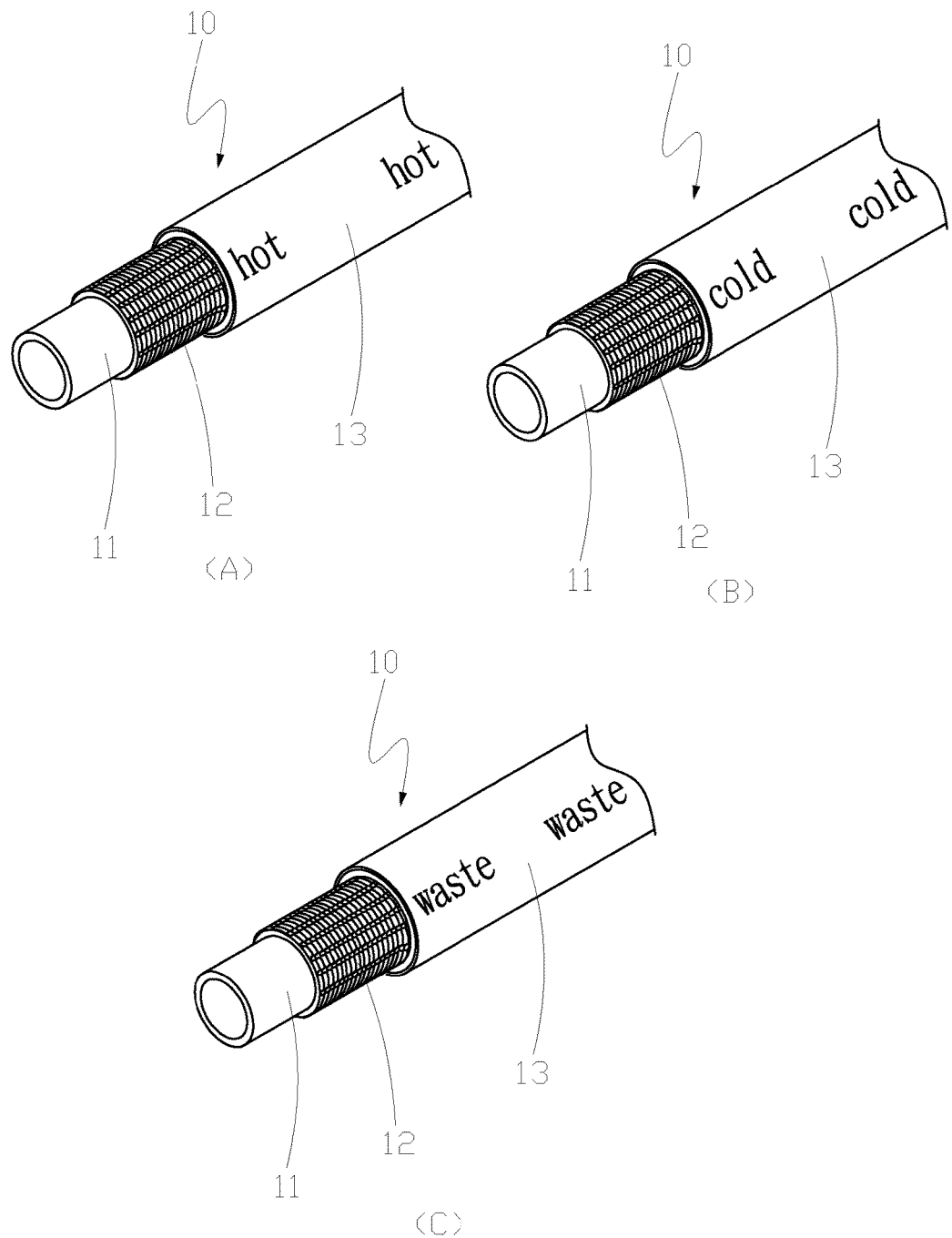
FIG. 7 is a schematic view of the compressive heat-resistant tube structure for RV in accordance with a third embodiment of the present invention, showing that the identification surface layer portion of the compressive PVC soft outer tube is marked with characters and figures (A) (B) (C) illustrate hot water, cold water, and waste water respectively.
Figure 8:
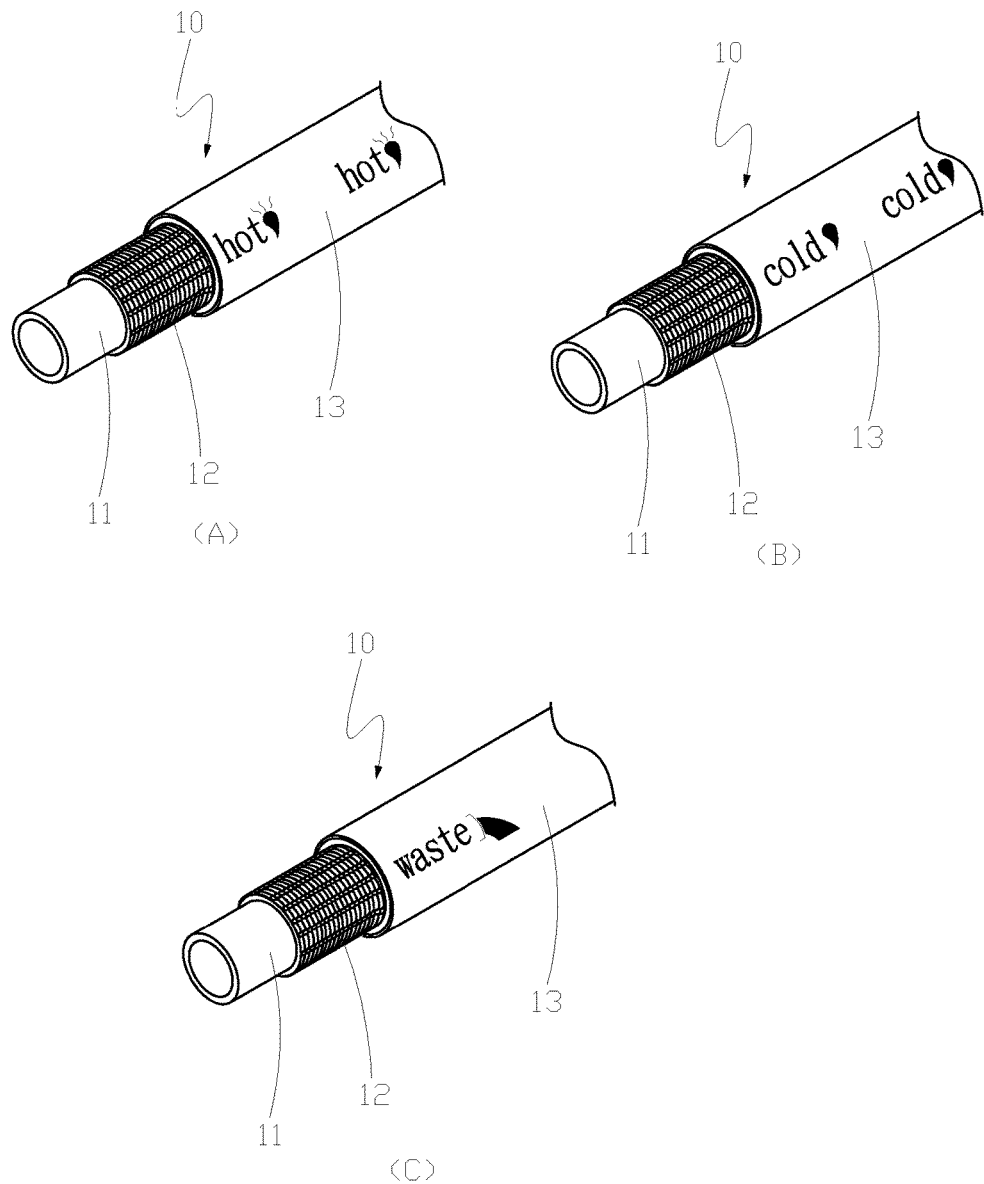
FIG. 8 is a schematic view of the compressive heat-resistant tube structure for RV in accordance with a fourth embodiment of the present invention, showing that the identification surface layer portion of the compressive PVC soft outer tube is marked with signs and figures (A) (B) (C) illustrate hot water, cold water, and waste water respectively.
Figure 9:
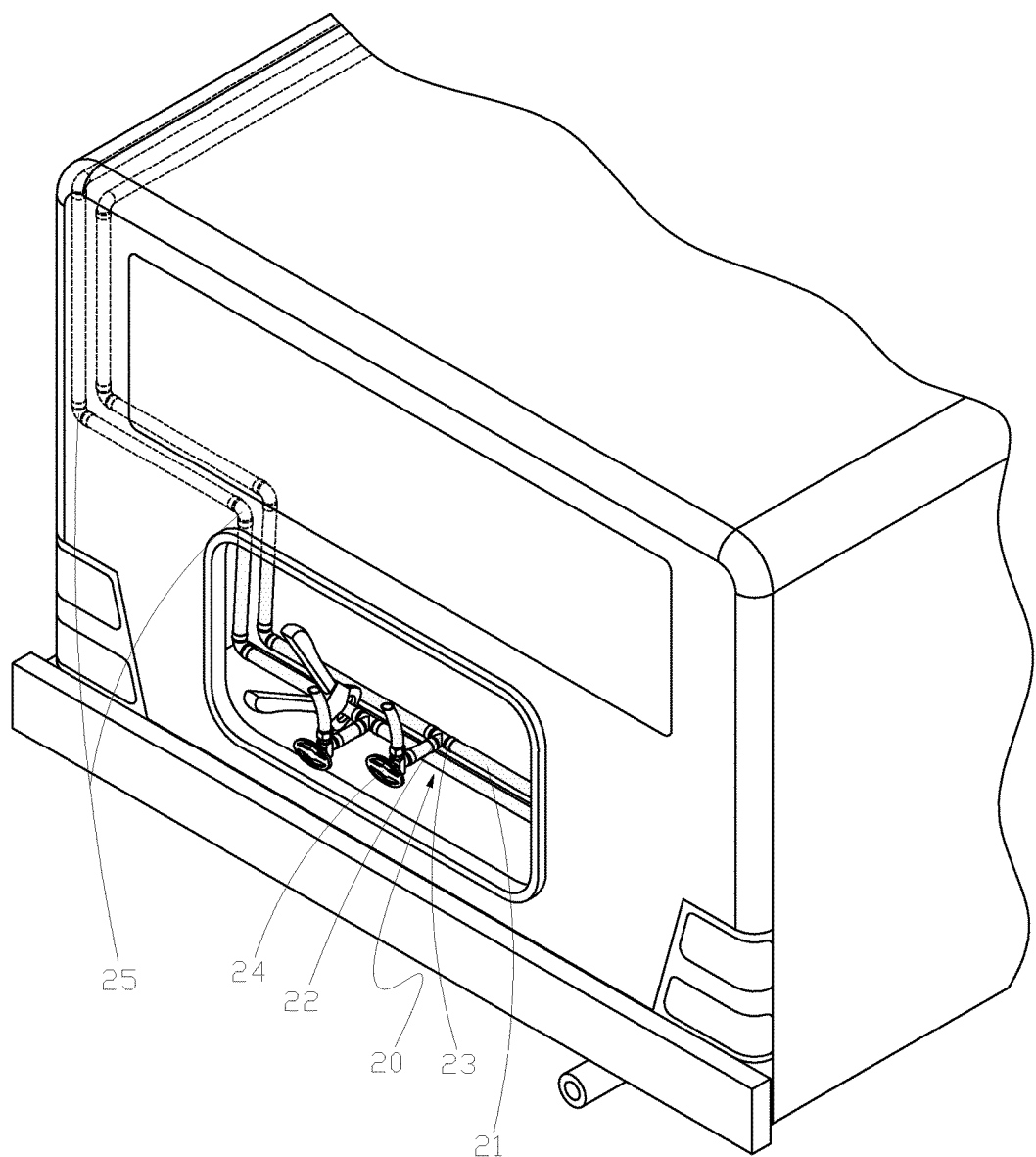
FIG. 9 is a schematic view of a conventional hard pipe structure used to a camping car.

FIG. 5 is a schematic view of the compressive heat-resistant tube structure for RV in accordance with a first embodiment of the present invention, showing that the compressive PVC soft outer tube is wrapped by the identification surface layer portion in a semi-circumferential manner. FIG. 6 is a schematic view of the compressive heat-resistant tube structure for RV in accordance with a second embodiment of the present invention, showing that the compressive PVC soft outer tube is wrapped by the identification surface layer portion in a circumferential manner. FIG. 7 is a schematic view of the compressive heat-resistant tube structure for RV in accordance with a third embodiment of the present invention, showing that the identification surface layer portion of the compressive PVC soft outer tube is marked with characters and figures (A) (B) (C) illustrate hot water, cold water, and waste water respectively. FIG. 8 is a schematic view of the compressive heat-resistant tube structure for RV in accordance with a fourth embodiment of the present invention, showing that the identification surface layer portion of the compressive PVC soft outer tube is marked with signs and figures (A) (B) (C) illustrate hot water, cold water, and waste water respectively. The whole structure is substantially similar to FIG. 1 through FIG. 4 with the exceptions described hereinafter. The identification surface layer portion 130 is disposed on the compressive PVC soft outer tube 13 in a circumferential or semi-circumferential manner. The identification surface layer portion 130 may be colored, such as blue, red, black, and so on for distinguishing a cold water tube, a hot water tube or a waste water tube. The identification surface layer portion 130 may be marked with characters or signs for distinguishing a cold water tube, a hot water tube or a waste water tube. The arrangement of the identification surface layer portion 130 allows the user to easily and quickly identify each tube for connection of the tubes, enhancing the convenience of use and providing a multi-function effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A compressive heat-resistant tube structure for RV (recreational vehicle), comprising:
a compressive heat-resistant multi-layer tube, the compressive heat-resistant multi-layer tube comprising a compressive heat-resistant PVC (polyvinyl chloride) soft inner tube, a polyester dense crocheted covering layer, and a compressive PVC soft outer tube, an outer surface of the compressive PVC soft outer tube being provided with an identification surface layer portion, the compressive heat-resistant PVC soft inner tube being wrapped by the polyester dense crocheted covering layer, the polyester dense crocheted covering layer being wrapped by the compressive PVC soft outer tube, the compressive heat-resistant multi-layer tube being flexible and bendable;
wherein the identification surface layer portion is opaque; is disposed on the compressive PVC soft outer tube; and is configured to distinguish a cold water tube, a hot water tube, or a waste water tube.

2. The compressive heat-resistant tube structure for RV as claimed in claim 1, wherein the identification surface layer portion is disposed on the compressive PVC soft outer tube in a circumferential or semi-circumferential manner.

3. The compressive heat-resistant tube structure for RV as claimed in claim 1, wherein the identification surface layer portion is blue, red or black for respectively distinguishing the cold water tube, the hot water tube, or the waste water tube.

4. The compressive heat-resistant tube structure for RV as claimed in claim 2, wherein the identification surface layer portion is blue, red or black for respectively distinguishing the cold water tube, the hot water tube, or the waste water tube.

5. The compressive heat-resistant tube structure for RV as claimed in claim 1, wherein the identification surface layer portion is marked with characters for distinguishing the cold water tube, the hot water tube or the waste water tube.

6. The compressive heat-resistant tube structure for RV as claimed in claim 2, wherein the identification surface layer portion is marked with characters for distinguishing the cold water tube, the hot water tube or the waste water tube.

7. The compressive heat-resistant tube structure for RV as claimed in claim 1, wherein the identification surface layer portion is marked with signs for distinguishing the cold water tube, the hot water tube, or the waste water tube.

8. The compressive heat-resistant tube structure for RV as claimed in claim 2, wherein the identification surface layer portion is marked with signs for distinguishing, the cold water tube, the hot water tube, or the waste water tube.

* * * * *